(12) United States Patent  (10) Patent No.: US 7,018,245 B2
Baker et al.  (45) Date of Patent: Mar. 28, 2006

(54) TERMINATION PANEL WITH FANNING STRIPS AND PIVOTAL COVER

(75) Inventors: Scott K. Baker, Richfield, MN (US); Harvey J. Chouanard, Deephaven, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/103,669

(22) Filed: Apr. 11, 2005

(65) Prior Publication Data

US 2005/0186858 A1  Aug. 25, 2005

Related U.S. Application Data

(62) Division of application No. 10/277,175, filed on Oct. 18, 2002, now Pat. No. 6,893,299.

(51) Int. Cl.
  *H01R 9/22* (2006.01)
(52) U.S. Cl. .................................................. 439/718
(58) Field of Classification Search ............... 439/718, 439/719, 403; 379/326, 327; 361/823, 825, 361/826; 174/138 F
  See application file for complete search history.

(56) References Cited

U.S. PATENT DOCUMENTS

| | | | |
|---|---|---|---|
| 3,753,216 A * | 8/1973 | Johnson et al. ............. 439/491 |
| 3,784,728 A * | 1/1974 | De Bortoli et al. ........... 174/60 |
| 3,852,703 A | 12/1974 | Carney et al. |
| 4,099,822 A * | 7/1978 | Carlisle et al. ............. 439/405 |
| 4,152,749 A | 5/1979 | Knickerbocker |
| 4,178,055 A * | 12/1979 | Fleischhacker et al. ..... 439/402 |
| 4,538,868 A * | 9/1985 | Cruise et al. ............... 439/131 |
| 4,548,453 A | 10/1985 | Mummey et al. |
| 4,603,377 A | 7/1986 | Kobayashi et al. |
| 4,649,236 A | 3/1987 | De Luca et al. |
| 4,665,546 A | 5/1987 | Brey et al. |
| 4,669,799 A * | 6/1987 | Vachhani et al. ........... 439/404 |
| 4,697,720 A * | 10/1987 | Hotchkiss et al. ....... 174/138 F |
| 4,722,702 A | 2/1988 | De Luca et al. |
| 4,737,985 A | 4/1988 | De Luca et al. |
| 4,749,968 A | 6/1988 | Burroughs |
| 4,770,639 A | 9/1988 | Lau |
| 4,820,200 A | 4/1989 | Lau |
| 4,840,568 A | 6/1989 | Burroughs et al. |
| 4,861,281 A | 8/1989 | Warner |
| 4,911,661 A | 3/1990 | Neuwirth |
| 4,975,087 A | 12/1990 | Williams et al. |
| 5,017,155 A | 5/1991 | Doyle |
| 5,078,624 A | 1/1992 | Burroughs et al. |
| 5,145,416 A | 9/1992 | Cruise et al. |
| 5,156,551 A | 10/1992 | Unger et al. |
| 5,170,327 A | 12/1992 | Burroughs |

(Continued)

FOREIGN PATENT DOCUMENTS

GB  1128209  9/1968

(Continued)

*Primary Examiner*—Neil Abrams
(74) *Attorney, Agent, or Firm*—Merchant & Gould P.C.

(57) ABSTRACT

A DSX system arranged to receive a plurality of high-density chassis is disclosed. The chassis include back planes having rear access IN/OUT fields and rear access cross-connect fields. The rear access IN/OUT fields are electrically connected to termination structures and panels located in respective IN/OUT regions and cross-connect regions. The termination structures of the IN/OUT region includes first and second fanning strips located along edges of termination panels. A double-hinged cover provides access to the termination panels. The double-hinged cover can be opened in a clockwise direction and a counter-clockwise direction.

14 Claims, 12 Drawing Sheets

U.S. PATENT DOCUMENTS

| | | |
|---|---|---|
| 5,199,878 A | 4/1993 | Dewey et al. |
| 5,220,600 A | 6/1993 | Chouanard et al. |
| 5,233,501 A | 8/1993 | Allen et al. |
| 5,393,249 A | 2/1995 | Morgenstern et al. |
| 5,413,494 A | 5/1995 | Dewey et al. |
| 5,417,588 A | 5/1995 | Olson et al. |
| 5,467,062 A | 11/1995 | Burroughs |
| 5,546,282 A | 8/1996 | Hill et al. |
| 5,634,822 A | 6/1997 | Gunell |
| 5,685,741 A | 11/1997 | Dewey et al. |
| 5,738,546 A | 4/1998 | Burroughs et al. |
| 5,938,478 A | 8/1999 | Werner |
| 6,038,766 A | 3/2000 | Werner |
| 6,116,961 A | 9/2000 | Henneberger et al. |
| 6,269,162 B1 | 7/2001 | McMillan |
| 6,437,243 B1 * | 8/2002 | VanderVelde et al. ..... 174/68.3 |
| 6,884,942 B1 * | 4/2005 | McGrath et al. ........... 174/68.1 |
| 6,893,299 B1 * | 5/2005 | Baker et al. ................ 439/719 |

FOREIGN PATENT DOCUMENTS

| | | |
|---|---|---|
| WO | WO 96/38884 | 12/1996 |
| WO | WO 99/26427 | 5/1999 |

* cited by examiner

TERMINATION PANEL WITH FANNING STRIPS AND PIVOTAL COVER

CROSS-REFERENCE TO RELATED APPLICATIONS

This application is a divisional application of application Ser. No. 10/277,175, filed Oct. 18, 2002, now U.S. Pat. No. 6,893,299; which application is incorporated herein by reference.

TECHNICAL FIELD

The present disclosure relates generally to telecommunications equipment. More particularly, the present disclosure relates to a terminal structure for a telecommunications system.

BACKGROUND

Cable management is important in the telecommunication industry. A typical telecommunication service provider's central office has thousands of cables/wires routed to different rack mounted components. Often the cables/wires are terminated at termination blocks (i.e. panels) mounted on racks. Cable management is crucial for preventing tangling of cables and for optimizing the most effective use of space. Example cable management structures include, among other things, channels, brackets, tie-down lances, dividers, radius limiters, and fanning strips.

SUMMARY

One aspect of the present disclosure relates to a high density termination structure having fanning strips positioned at opposite edges of a panel. Another aspect of the present disclosure relates to a termination structure having a panel with integrally formed fanning strips. A further aspect of the present disclosure relates to a termination structure having dual fanning strips and a cover with dual hinges. Still another aspect of the present disclosure relates to a high density telecommunications system including termination structures having panels with dual fanning strips.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

I. Termination Structure

FIGS. 1–6 illustrate a termination structure 67 having features that are examples of how inventive aspects in accordance with the principles of the present disclosure may be practiced. Preferred features are adapted for promoting cable management and enhancing the circuit density of the termination structure 67.

Figure 1:
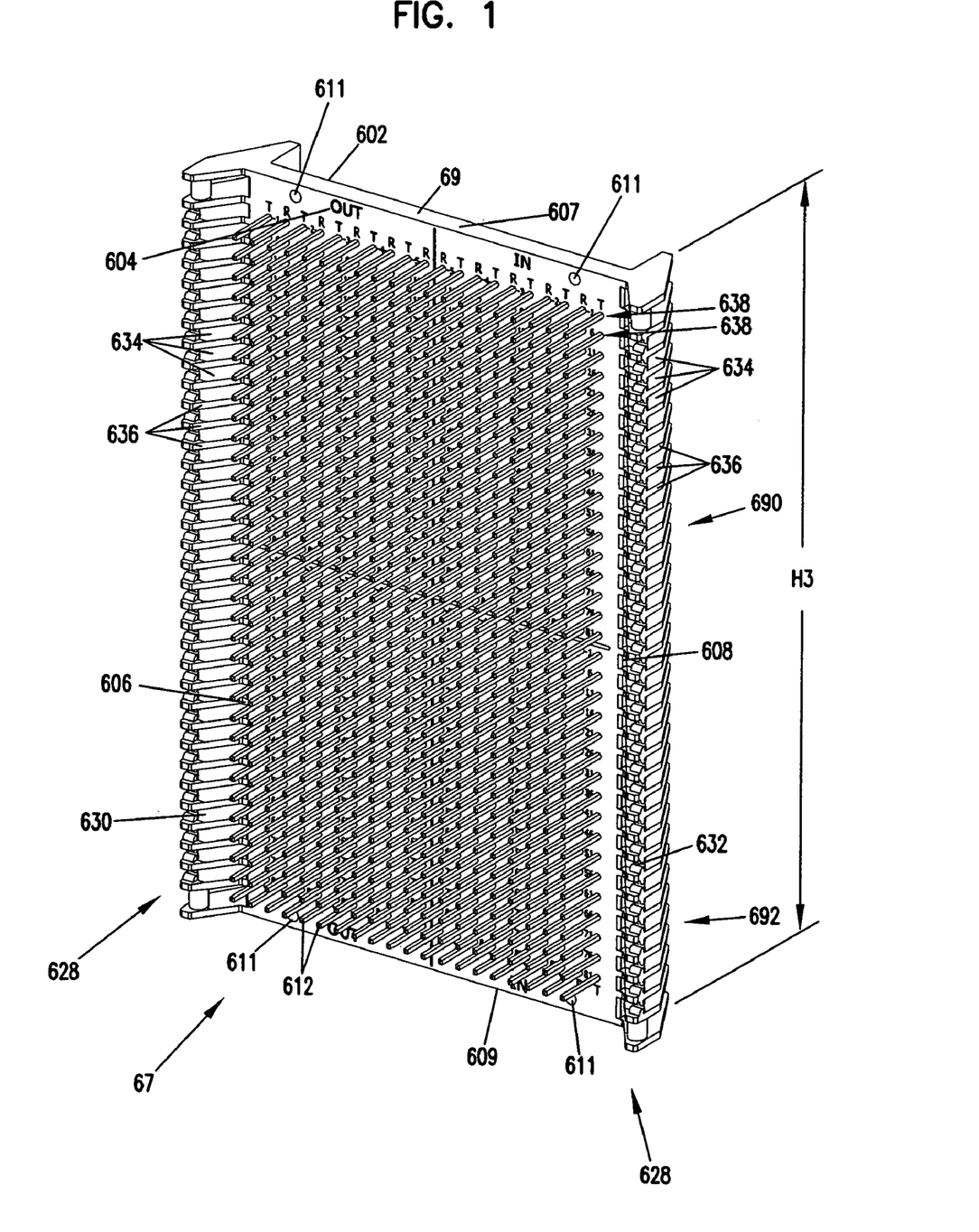
FIG. 1 is a perspective view of an embodiment of a termination structure in accord with the present disclosure.
Figure 2:
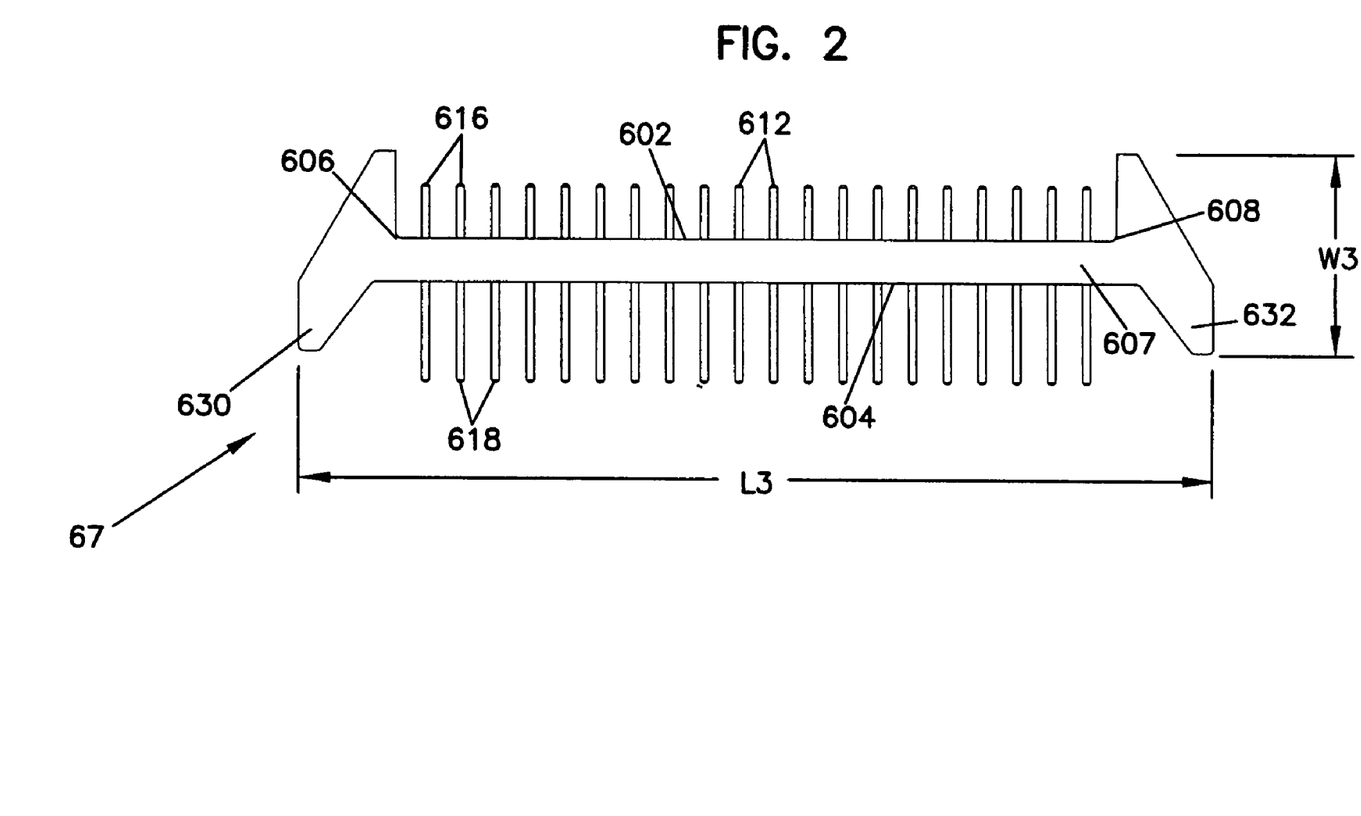
FIG. 2 is a top plan view of the termination structure of FIG. 1.

Referring to FIG. 1, one embodiment of the termination structure 67 is illustrated. The termination structure includes an IN/OUT termination panel 69 having a front side 602, a rear side 604. The front side 602 and the rear side 604 extend between opposite first and second edges 606, 608, and opposite third and fourth edges 607, 609. The panel 69 includes termination members 612. As best shown in FIG. 2, the illustrated termination members 612 can include wire wrap pins/posts that are mounted or staked within an array of holes 610 (shown in FIG. 11). The termination members 612 extend through the panel 69 from the front side 602 to the rear side 604. In other words, a front end or portion 616 of the termination members 612 extends from the front side 602 of the termination panel 69 and a rear end or portion 618 extends from the rear side 604 of the panel 69.

Aside from including wire wrap pins/posts, the termination members 612 may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

a. Fanning Strip

Referring to FIGS. 1 and 2, the termination structure 67 includes the termination panel 69 and at least one cable management device 628. The cable management device 628 can include, for example, tie down bars, rings, fingers, loops, brackets, or punch-out areas. In the illustrated embodiment the cable management device 628 includes a fanning strip 630, more preferably, a first fanning strip 630 and a second fanning strip 632. The first fanning strip 630 is positioned along the first edge 606 of the panel 69 and the second fanning strip 632 is positioned along the second edge 608 of the panel.

Each fanning strip 630, 632 includes a plurality of slots 634 (FIG. 1) and dividers 636. The dividers 636 are spaced apart so that the slots 634 align with horizontal rows 638 of termination members 612 (e.g. wire wrap posts/pins). The slots 634 of the first fanning strip 630 are also in alignment with the slot 634 of the second fanning strip 632. In the illustrated embodiment, the fanning strips 630, 632 are integrally molded with the panel 69 of the termination structure 67 such that the fanning strips 630, 632 and the panel 69 are formed as a single monolithic/unitary piece. It is contemplated that the fanning strips 630, 632 can also be a detachable component of the termination block 62.

The IN/OUT termination structure 67 has a length L3 (FIG. 2), a width W3, and a height H3 (FIG. 1). The length L3 of the IN/OUT termination panel 69 is generally between the range of 4 inches and 6 inches, preferably about 5 inches; the width W3 is generally between the range of 0.75 inches and 2 inches, preferably about 1 inch; and the height H3 is generally between the range of 7 inches and 8.5 inches, preferably less than 8 inches. Of course, other sized panels could also be used.

In the illustrated embodiment of FIG. 1, the termination structure 67 has a length L3 of approximately 5.25 inches and a height H3 of approximately 7.75 inches. An upper half 690 of the termination panel 69 of the termination structure 67 corresponds to one chassis 32 and a lower half 692 corresponds to another chassis 32. Each termination panel 69 includes four termination members 712 for each jack insert 36, 38 of two chassis 32. Accordingly, the termination panel 69 has at least six hundred and seventy two (672) termination members 712; or a termination density of at least 16 terminations per square inch. In the illustrated embodiment, the termination panel 69 provides 680 termination members. It is contemplated that in alternative embodiments, the termination panel may correspond to only one chassis or greater than two chassis. In such embodiments, the panels preferably have generally the same termination density of at least 16 terminations per square inch.

b. Cover

Figure 3:
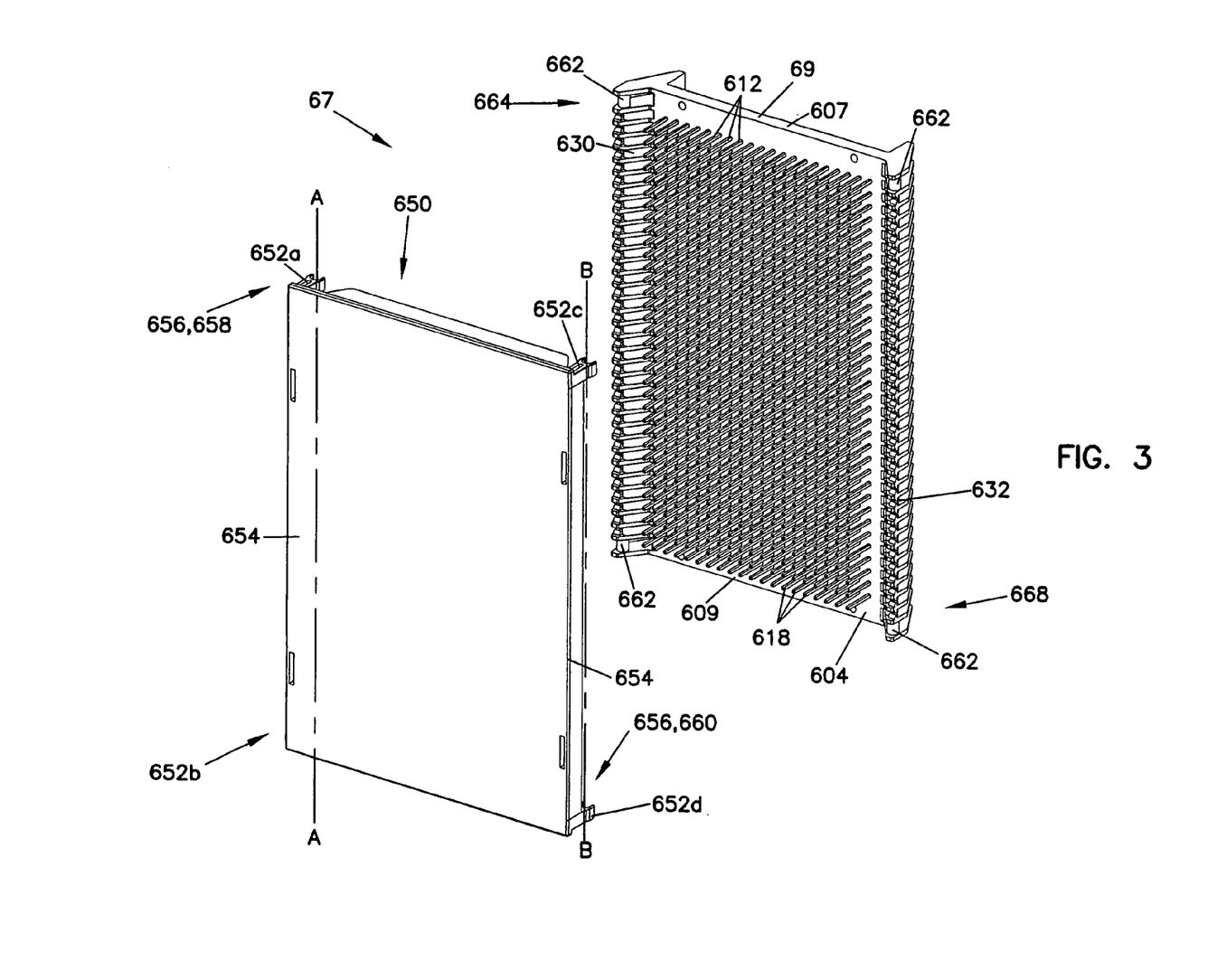
FIG. 3 is an exploded perspective view of the termination structure of FIG. 1, shown with a cover.
Figure 4:
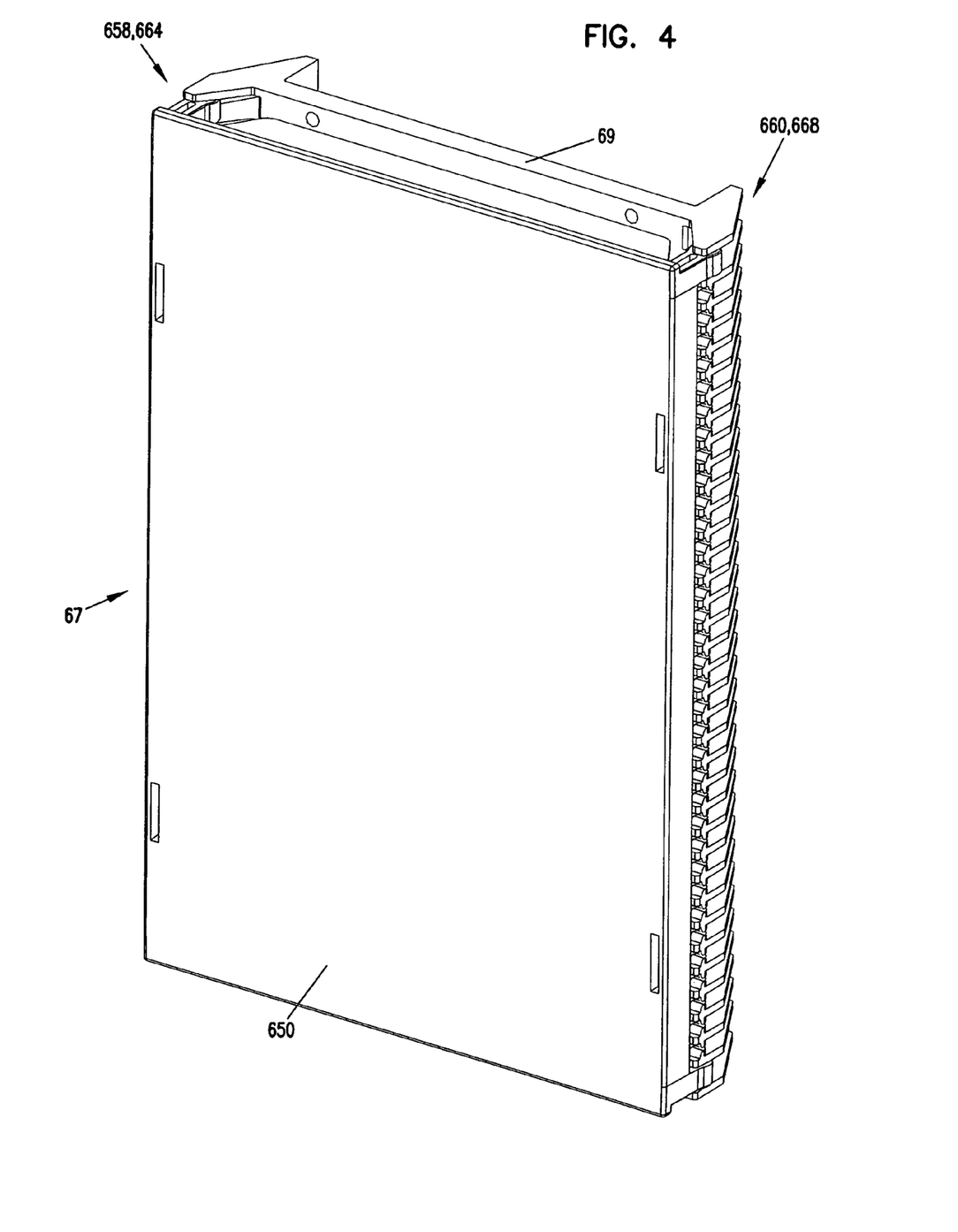
FIG. 4 is a perspective view of the termination structure of FIG. 3, shown with the cover assembled.

Referring now to FIG. 3, the termination structures 67 can include removeable covers 650 to cover and protect the termination members 612 extending from the rear side 604 of the structures 67 (see also FIG. 4). The cover 650 includes at least one connection 652 that detachably secures the cover 650 to the structure 67. In the illustrated embodiment, the cover 650 includes four connections (652a-652d) located adjacent edges 654 of the cover 650.

The connections 652 are preferably hinged connections 656 to permit a user to access the rear portions 618 of the termination members 612 without having to completely remove the cover from the termination structure 67. In the illustrated embodiment, the cover includes a first hinged connection 658 defining a first pivot axis A—A, and a second hinged connection 660 defining a second pivot axis B–B spaced apart from the first pivot axis A—A. The first hinged connection 658 includes two connections 652a and 652b. The second hinged connection 660 also includes two hinged connections 652c and 652d.

The first hinged connection 658 and the second hinged connection 660 couple to the termination structure 67. In the illustrated embodiment, the first and second hinged connections 658, 660 couple to the respective first and second fanning strips 630, 632. The fanning strips 630, 632 include corresponding hinge structure 662, including a first hinge structure 664 and a second hinge structure 668, for detachable receipt of the cover 650. Preferably, hinged connections 652 and the hinged structures 662 form snap-fit hinges for ease of assembly and use.

Figure 5:
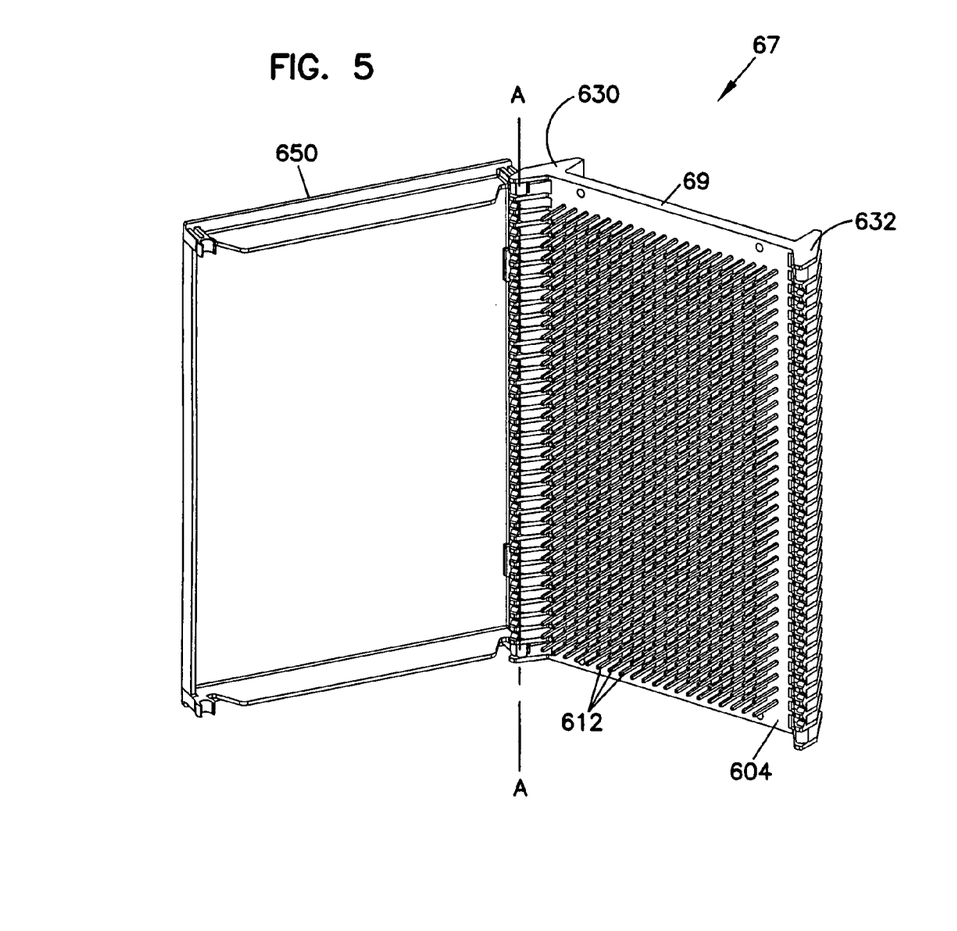
FIG. 5 is a perspective view of the termination structure of FIG. 3, shown with the cover open in one direction.
Figure 6:
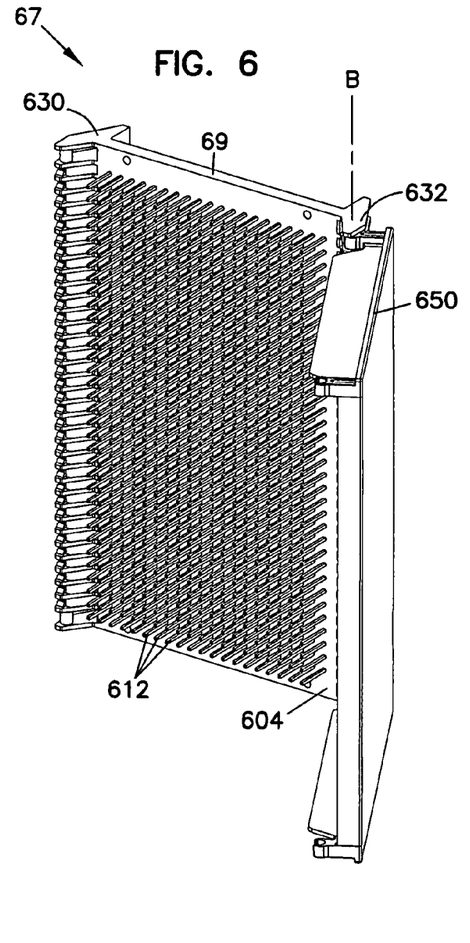
FIG. 6 is a perspective view of the termination structure of FIG. 3, shown with the cover open in an opposite direction.

As shown best in FIGS. 5 and 6, the termination members 612 can be accessed at the rear side 604 of the termination panel 69 by pivoting the cover 650 toward the left about the first hinged axis A—A (or pivoting the cover clockwise when viewed from the top). The termination members 612 can also be accessed at the rear side 604 of the termination panel 69 by pivoting the cover 650 toward the right about the second hinged axis B—B (or pivoting the cover counter-clockwise when viewed from the top). Thus, a user can access cable connections extending through either the first fanning strip 630 or the second fanning strip 632. This provides a user with flexibility in setting up cable management schemes and simplifies maintenance access.

The first and second hinged axes of the termination structure 67 are shown in a generally parallel relationship, i.e. a vertical and generally parallel relationship. In use, the cover is arranged to pivot, for example, about the first axis A—A adjacent to the first fanning strip 630 while not disturbing the placement of the cable separated by and extending through the first fanning strip 630. Thus, a user can access cable connections that extend through the second fanning strip 630 without disrupting the cable connections extending through the first fanning strip 632. It is contemplated that, if desired, the cover could also be arranged to pivot upward or downward, in accord with the principles disclosed.

II. Exemplary System Incorporating the Termination Structure

Figure 7:
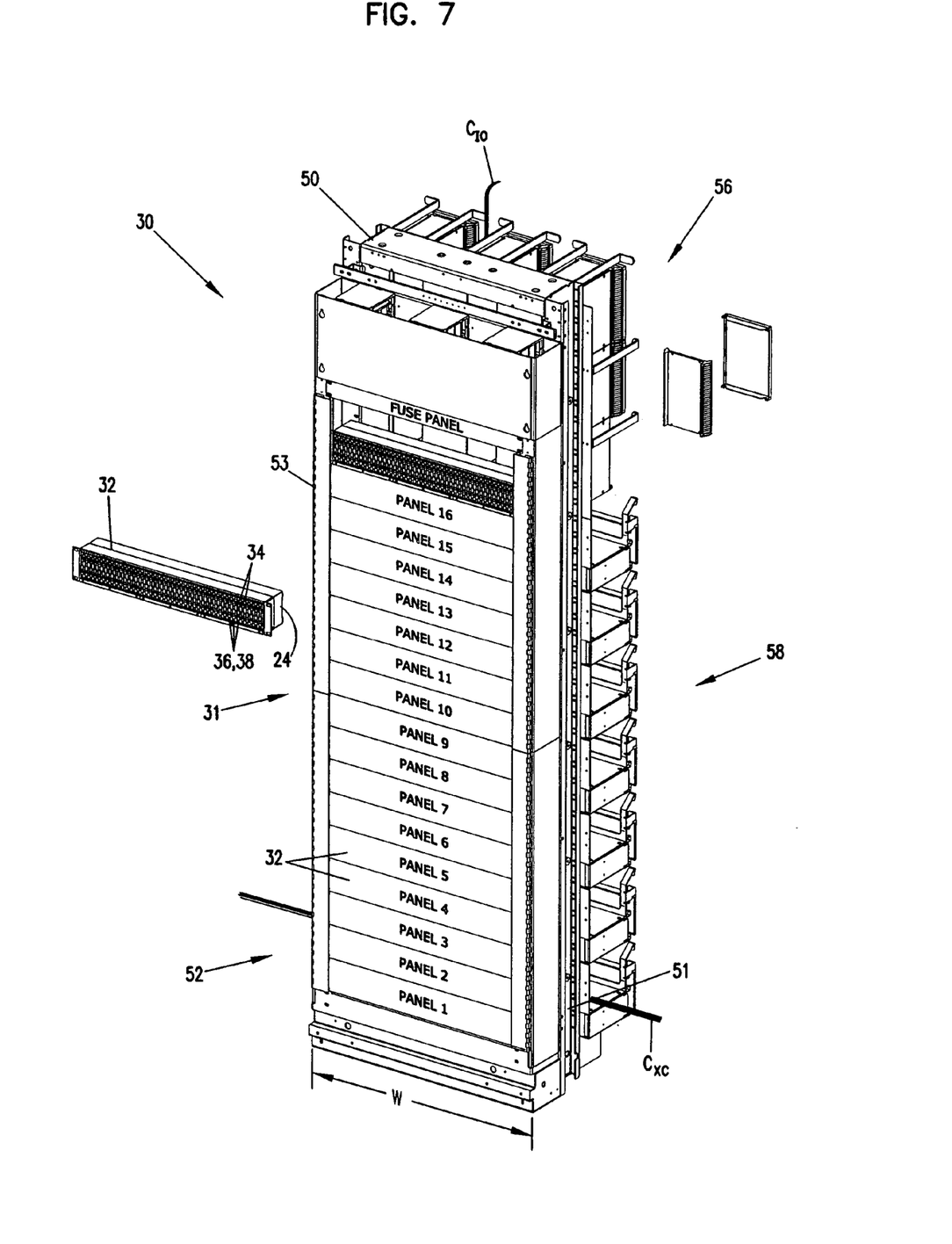
FIG. 7 is a front perspective view of a DSX system that includes the termination structure of FIGS. 1–6.
Figure 8:
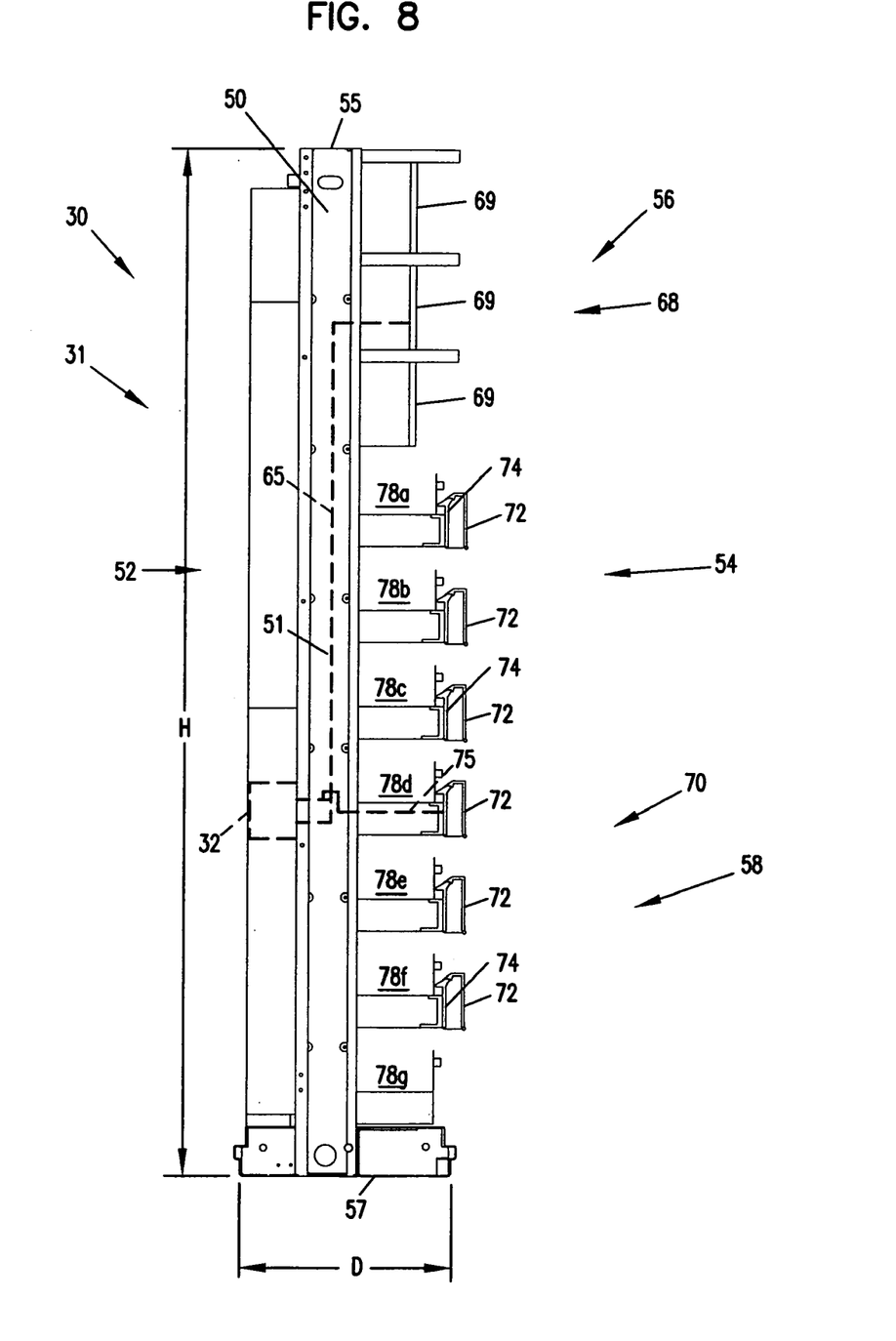
FIG. 8 is a side elevational view of the DSX system of FIG. 7.
Figure 9:
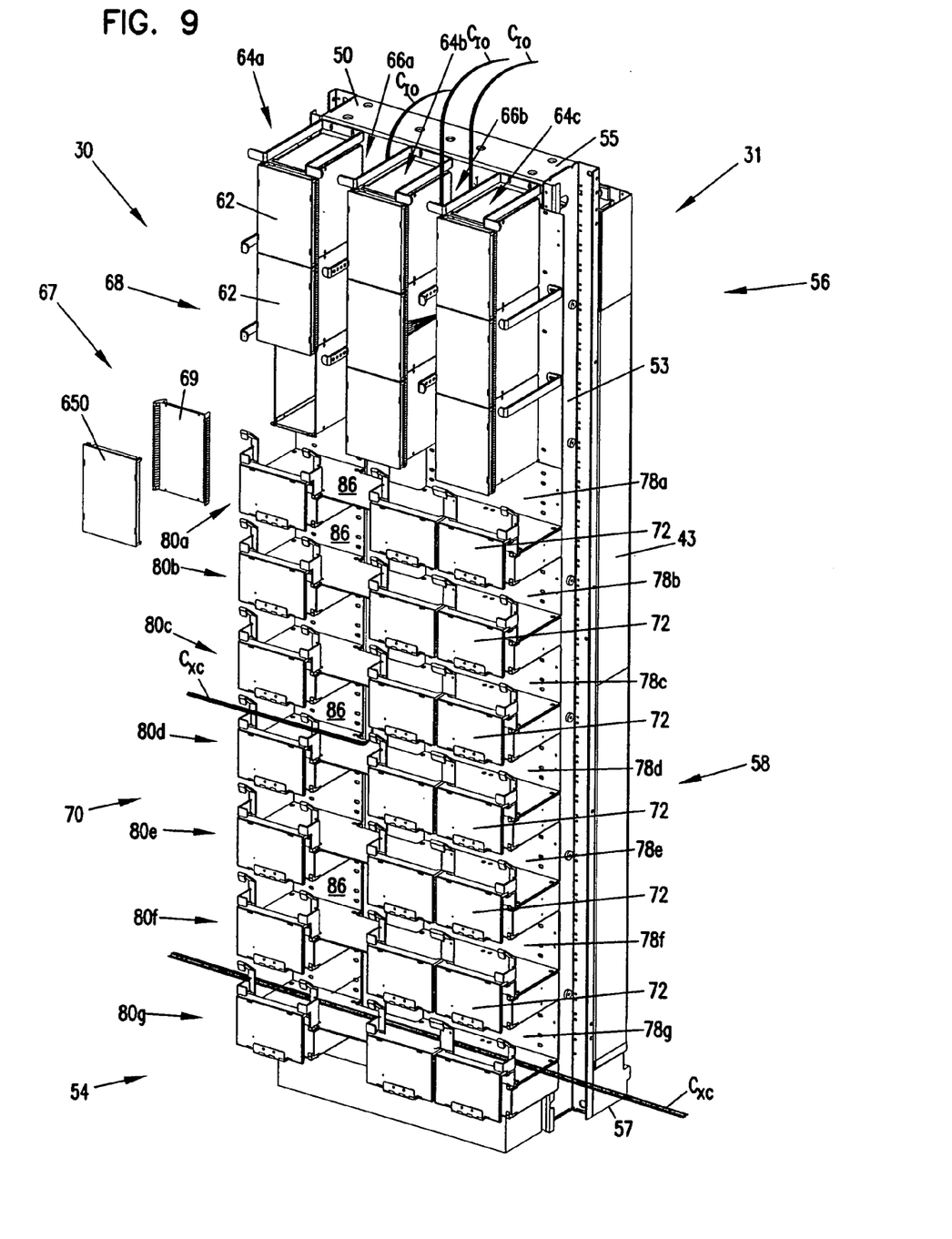
FIG. 9 is a rear perspective view of the DSX system of FIG. 7.

FIGS. 7–9 illustrate a exemplary high density DSX system 30 that is one embodiment of a system used in conjunction with the disclosed termination structure. The illustrated DSX system 30 includes a bay 31 having a front side 52 (FIG. 7) and an opposite back side 54 (FIG. 9). The bay 31 is configured to hold a plurality (e.g., eighteen) of chassis 32. Each chassis 32 is sized to hold a plurality (e.g., twenty-one) of removable jack modules 34. Each of the jack modules 34 is configured to hold a plurality (e.g., four) of jack inserts 36, 38. The jack modules 34 are electrically interconnected to a back plane 24 (FIG. 7) that mounts at the rear of each chassis 32. The back plane 24 includes a rearwardly facing cross-connect field 40 and a rearwardly facing IN/OUT field 42 (schematically represented in FIGS. 10A and 10B). The fields 40, 42 may also be referred to as panels, arrays, or blocks. The fields 40, 42 include a plurality of termination structures that interconnect with a cross-connect region 70 and an IN/OUT region 68, respectively (shown schematically in FIG. 11B).

In general, the DSX system 30 defines normal-through circuits including normal through switches that provide electrical pathways between the IN/OUT field and the cross-connect field. Parts corresponding to the normal-through circuits provide means for breaking the normal-through connections between the IN/OUT and cross-connect fields to allow for signal patching and test operations. Monitor ports can also be provided.

a. Electrical Operation Overview

To mount a jack module 34 in electrical communication with the back plane 24 of the chassis 32, the jack module 34 is inserted through a front opening of the chassis 32. The jack mounts 34 are then secured to the chassis 32. In similar fashion, the jack modules can be removed from the chassis 32 by un-securing the jack mount 34 manually pulling the module 34 from the front opening 114 of the chassis 32.

Individual jack inserts 36, 38 can be removed from and inserted into the jack module 34 as necessary. It is to be understood that in accord with the principles disclosed, the system can be configured such that the jack inserts are inserted within the chassis directly to the back plane without the intermediate jack module 34 connection. For example, the chassis itself can include integral jack mounting structure (e.g. guide or tracks) for individually receiving the jack inserts.

Figure 10A:
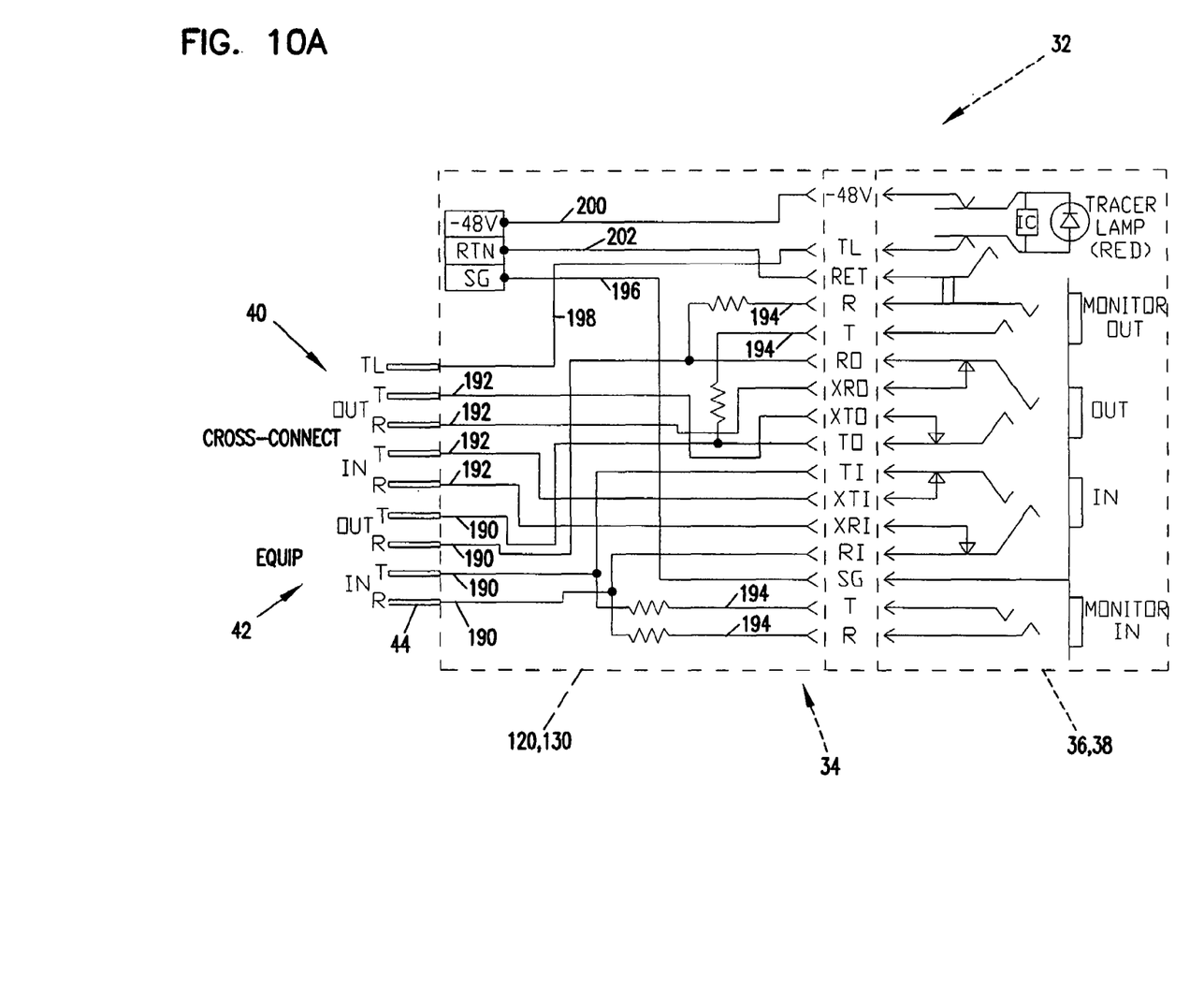
FIG. 10A is a schematic diagram of a DSX circuit within a chassis of the DSX system of FIG. 7.

Referring now to FIG. 10A, a circuit schematic of one of the jack inserts 36, 38 in relation to the rear access configuration of the chassis 32 is illustrated. As shown, the electrical contacts of the jack inserts 36, 38 include a voltage contact −48V, tracer lamp contact TL, and return contact RET corresponding to a LED circuit. The electrical contacts also include tip springs T and ring springs R corresponding to the monitor-in and monitor-out ports. The electrical contacts further include a tip-in contact TI, ring-in contact RI, cross-connect tip-in contact XTI, and cross-connect ring-in contact XRI corresponding to the in port. The electrical contacts further include a tip-out contact TO, ring-out contact RO, cross-connect tip-out contact XTO, and cross-connect ring-out contact XRO corresponding to the out port. The contacts operate in the same manner described in U.S. Pat. No. 6,116,961 that was previously incorporated by reference. The contacts TI, RI, XTI and XRI and the contacts TO, RO, XTO and XRO include springs that cooperate to define normally "through" or normally "closed" switches that provide electrical pathways between the cross-connect field 40 and the IN/OUT field 42 in the absence of a plug.

In particular, first and second circuit board sections 130, 120 of the jack module 34 and chassis 32 include tracings 190 that electrically connect termination structures or members 44 of the IN/OUT field 42 to the contacts TI, RI, TO and RO of the jack inserts 36, 38. The circuit board sections 130, 120 also include tracings 192 that provide electrical connections between termination structures or members 44 of the cross-connect field 40 and contacts XTI, RTI, XTO and XRO of the jack inserts 36, 38. Additionally, the circuit board sections 130, 120 include tracings 194 that electrically connect the tracings 190 to the MONITOR ports of the jack inserts 36, 38.

Further, as illustrated schematically, the circuit board sections 130, 120 include tracing 196 for connecting a sleeve ground pin (not shown) to the sleeve ground contact SG of the jack inserts 36, 38; tracing 198 for connecting a tracer lamp pin of the cross-connect field 40 to the tracer lamp contacts TL of the jack inserts 36, 38; tracing 200 for connecting a power pin (not shown) to the voltage contact −48V of the jack inserts 36, 38; and tracing 202 for connecting a power return pin (not shown) to the return contact RET of the jack inserts 36, 38.

Figure 10B:
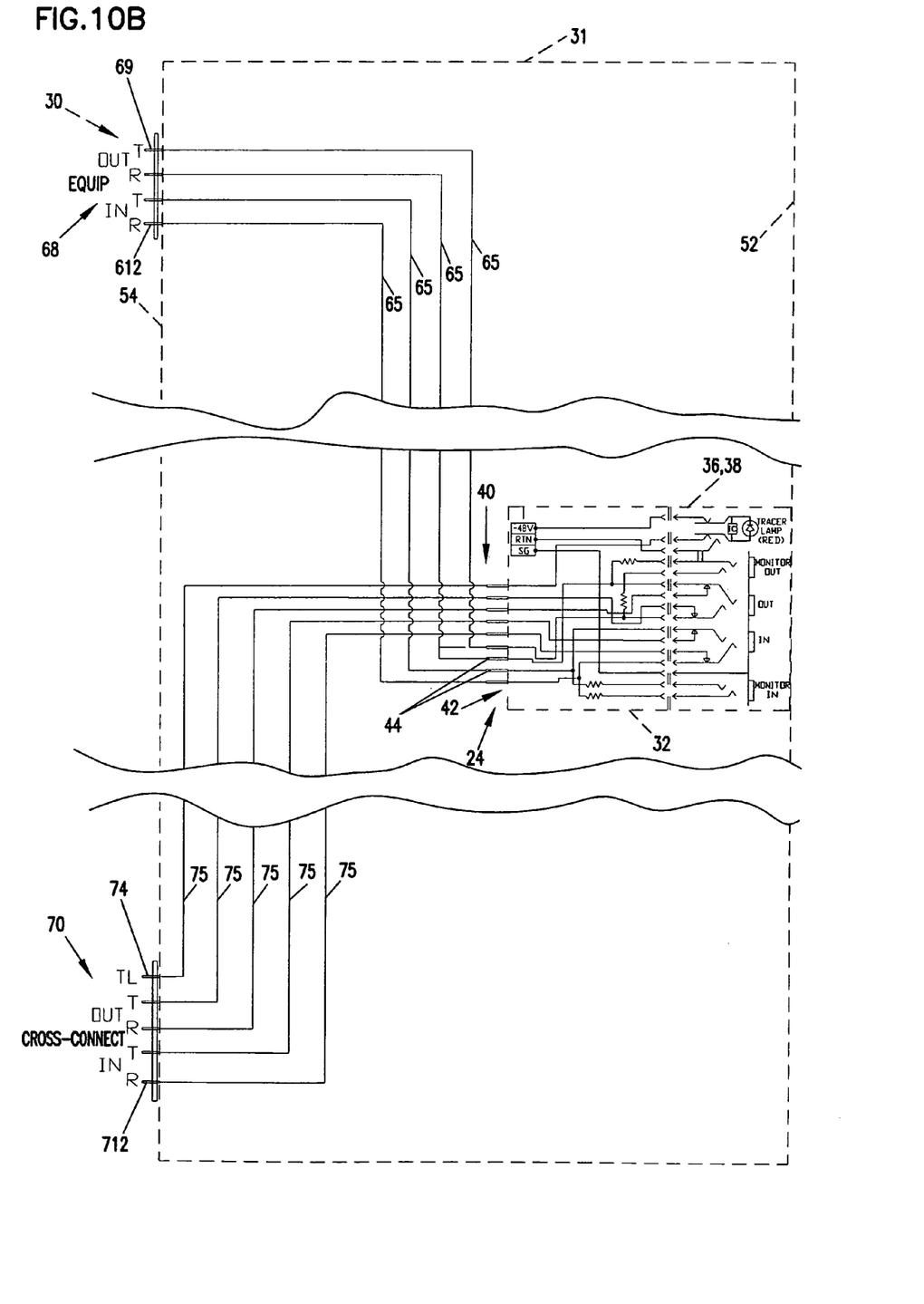
FIG. 10B is a schematic diagram of a DSX circuit of the DSX system of FIG. 7.

FIG. 10B illustrates the one jack insert 36, 38 interconnected to the DSX system 30. The chassis 32 is arranged such that the cross-connect field 40 and the IN/OUT field 42 of the back plane 24 face toward the back side 54 of the bay 31. Thus, when the chassis 32 is mounted to the bay 31, intermediate electrical connections 65 and 75 can be routed from the back plane 24 of the chassis 32 to an IN/OUT region 68 and a cross-connect region 70 located on the back side 54 of the bay 31 (see also FIG. 8).

The termination structures or members 44 of the cross-connect and IN/OUT fields 40, 42 can include wire wrap pins/posts. The termination members 44 may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

b. High-Density DSX Bay

Referring back to FIG. 8, the bay 31 of the high density DSX system 30 includes a frame 50 (i.e. a rack) having a front 52, a rear 54, a top 55, and a bottom 57. The frame 50 has a height H measured from the bottom 57 to the top 55, a depth D measured from the front 52 to the rear 52, and a width W (FIG. 7) measured between side supports 51, 53 of the frame 50. In the illustrated embodiment the height H of the frame is between 7 feet and 12 feet; the depth D is between 15 and 19 inches; and the width W is between 22 and 30 inches. For a conventional U.S. rack, the height H is often about 9 to 11 feet; the depth D is about 18.75 inches; and the width W is about 26 inches. For a conventional European rack, the height H is about 2.2 m; the depth D is about 746 mm; and the width W is about 600 mm.

As schematically illustrated in FIG. 10B, the system 30 is arranged such that the IN/OUT fields 42 are electrically connected to the IN/OUT region 68. As shown in FIGS. 8 and 9, the IN/OUT region 68 is positioned in an upper region 56 at the rear 54 of the bay 31. The cross-connect fields 40 are electrically connected to the cross-connect region 70. The cross-connect region 70 is located in a lower region 58 at the rear 54 of the bay 31.

Referring now to FIG. 7, the front 52 of the bay 31 is configured to receive the plurality of the chassis 32. The plurality of chassis 32 of the present system 30 typically includes about 14–21 chassis, preferably 18 chassis. In the illustrated embodiment having 18 chassis, the system 30 is configured to accommodate 84 circuits (21 jack modules each having 4 jack inserts) at each chassis for a system total of 1512 circuits (18 chassis each having 84 cross connection circuits). Other chassis sizes and bay sizes are contemplated. In accord with the principles disclosed, the system 30 provides an increased circuit density and a cable management arrangement not previously provided by conventional systems, to effectively and efficiently manage of a mass number of digital circuits.

i. Cross-Connect Region

Figure 12:
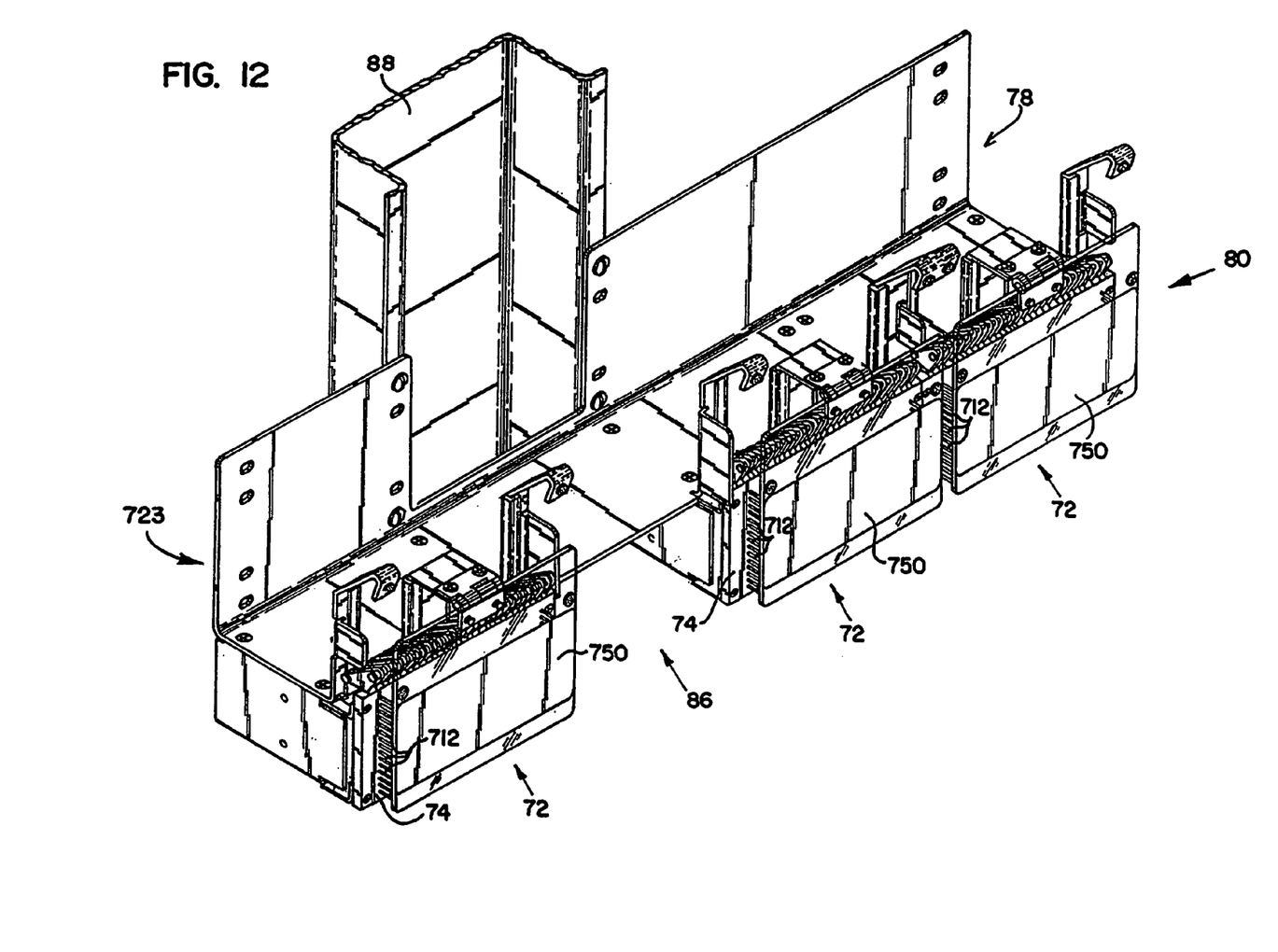
FIG. 12 is a rear perspective view of a portion of a cross-connect region of the DSX system of FIG. 7.

Referring back to FIG. 8, the cross-connect region 70 is located in the lower region 58 of the bay 31 and includes a plurality of cross-connect wire termination blocks 72. Each cross-connect termination block 72 includes a cross-connect termination panel 74 (FIG. 12). As shown in FIG. 9, the plurality of cross-connect termination blocks 72 are arranged in rows 80 (e.g. 6 horizontal rows 80a–80g). Horizontal cross-connect cable management channels 78 (i.e. horizontal channels 78a–78g) are defined between the rows 80 of the cross-connect blocks 72. As will be described in greater detail, the horizontal cross-connect channels 78 receive cables $C_{XC}$ from other bays that terminate at cross-connect blocks 72 of the cross-connect region 70.

Referring now to FIG. 12, one embodiment of a cross-connect termination region 70 is partially shown. The illustrated embodiment is described in U.S. Pat. No. 5,220,600 and herein incorporated by reference in its entirety. A vertical cross-connect cable management channel 88 is forwardly offset from the horizontal cross-connect cable management channels 78(a–g). The vertical cross-connect cable management channel 88 allows cables to be routed from one horizontal cross-connect channel, e.g. 78a, to another horizontal cross-connect channel, e.g. 78d. Access gaps or openings 86 are provided in the horizontal rows 80 between the connector blocks 72. The access openings 86 assist a user in routing cables from the vertical cross-connect cable management channel 88 to one of the horizontal cross-connect channel 78a–78g, and vise versa.

The cross-connect field 40 of each chassis 32 is electrically connected to a corresponding cross-connect termination panel 74 of the cross-connect region 70 by an interconnect or intermediate cross-connect cable 75, shown schematically in FIG. 10B. As shown best in FIG. 12, each of the cross-connect termination panels 74 includes termination members 712. The termination member can include wire wrap pins/posts, as shown, and can include other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

In the illustrated embodiment, the termination members 712 are wire wrap pins that are mounted within an array of holes (not shown) extending through the panel 74. The intermediate cables 75 interconnect the termination member 712 of the cross-connect panel 74 and the cross-connect field 40 of the chassis 32.

Still referring to FIG. 12, a mounting bracket assembly 723 mounts each cross-connect termination panel 74 to the lower region 58 of the frame 50. In the illustrated embodiment, a cover 750 is provided to protect the termination members 712. The cover 750 can be pivotally attached to the mounting bracket assembly 723 and configured to pivot upward or downward to access the termination members 712.

ii. IN/OUT Region

Referring back to FIG. 9, the IN/OUT region 68 is located in the upper region 56 of the bay 31 and includes a plurality of IN/OUT wire termination blocks 62, each IN/OUT termination block including one of the termination structures 67.

Figure 11:
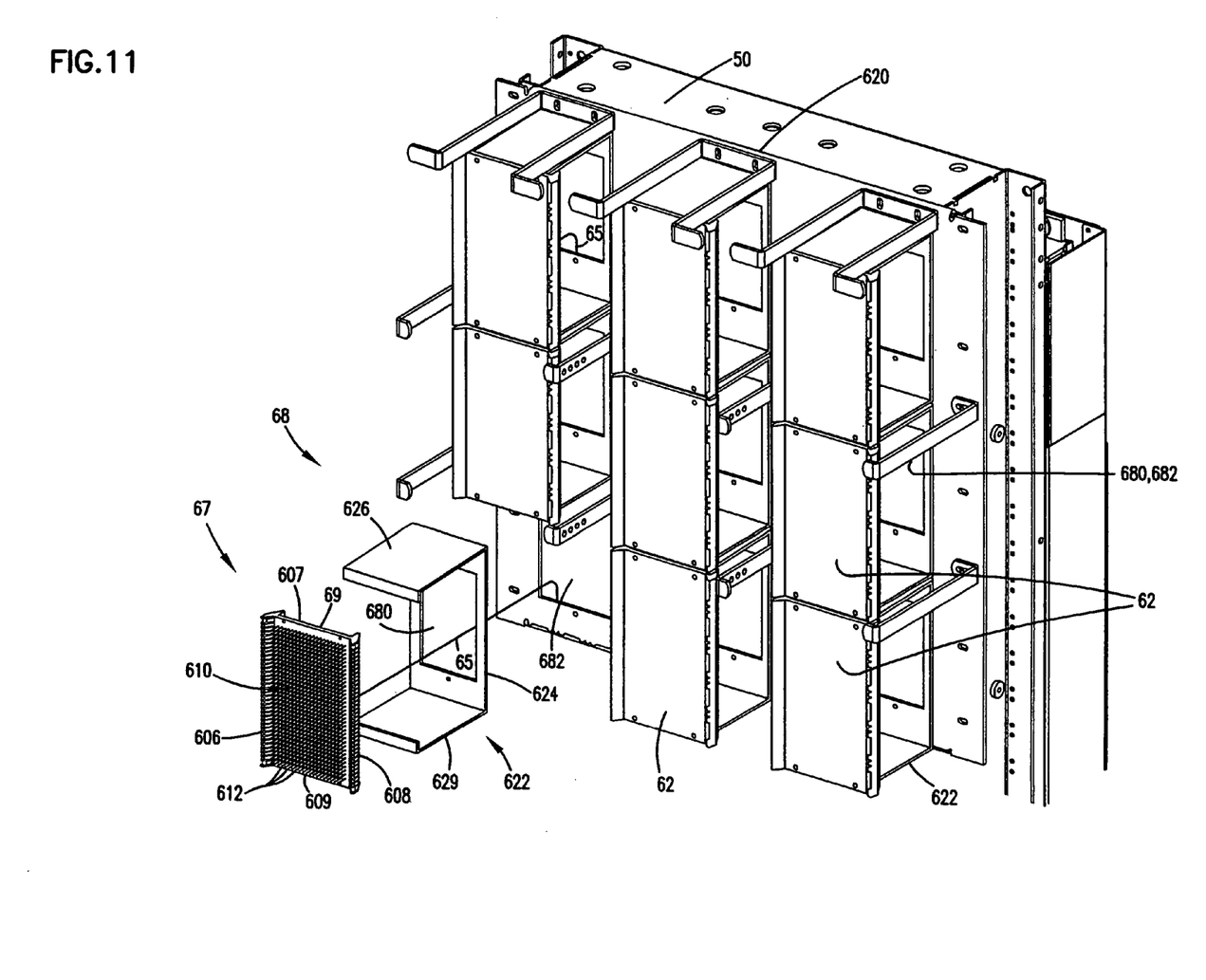
FIG. 11 is an exploded rear perspective view of an IN/OUT termination region of the DSX system of FIG. 7.

As shown best in FIG. 11, each of the termination blocks 62 includes a bracket 622 to mount the termination structure 67 to a frame backing 620. The frame backing 620 is secured to the rear or back side 54 of the frame 50 (FIG. 9). The bracket 622 has a mid-portion 624 and first and second extensions 626, 629. The mid-portion 624 of the bracket 622 includes a cable passage 680 corresponding to a cable passage 682 in the frame backing 620. The opposite third and fourth edges of the termination structures 67 include mounting structure 611 for mounting the panel 69 to the extensions 626, 629 of the bracket 622. The first and second edges 606, 608 extend in a generally vertical or upright orientation when mounted to the IN/OUT region 68 of the bay 31.

In the illustrated embodiment of FIG. 9, the blocks 62 are mounted in a plurality of columns 64 (e.g. 3 vertical columns 64a–64c). Vertical IN/OUT cable management channels 66 (i.e. channels 66a and 66b) are defined between the columns 64 of termination blocks 62. The vertical IN/OUT cable management channels 66 provide paths for cables admitted from the top 55 of the bay 31. In particular, cables $C_{IO}$, routed from other equipment, enter the top 55 of the bay 31, are routed through the vertical cable management channels 66, and terminate at the termination panels 69 of the termination structure 67. The cables are preferably routed to the termination blocks from both sides of the blocks thereby utilizing both of the fanning strips of each block. In the illustrated system 30, the cables $C_{IO}$ are routed from the ceiling of the surrounding area. It is contemplated that the cables $C_{IO}$ routed from other equipment can be routed from a raised floor and enter the bay 31 from the bottom 57. In a raised floor application the IN/OUT region 68 can be located in the lower region 58 of the bay 31 and the cross-connect region 70 can be located in the upper region 56.

The IN/OUT field 42 of each chassis 32 is electrically connected to a corresponding termination panel 69 of the IN/OUT region 68 by the interconnect or intermediate IN/OUT cable 65, shown schematically in FIG. 10B. In the illustrated embodiment, two chassis are connected to each of the termination blocks 62. The intermediate IN/OUT cables 65 are routed from the IN/OUT field 42 of the back plane 24 of the chassis 32 through the cable passages 680 and 682 (FIG. 11) in the frame backing 620 and bracket 622.

iii. Overall Cable Management

With the arrangement thus described, a large number of digital cross connection circuits can be effectively managed and organized. In particular, for example, cables $C_{IO}$ (FIG. 9) from a separate piece of equipment enter at the top 55 of the frame 50 and run within the vertical IN/OUT cable management channels 66 of the IN/OUT region 68. Wire connections of the equipment cables $C_{IO}$ are fed through a fanning strip 630, 632 (FIG. 1) and terminate at termination members 612 on the rear side 604 of a particular termination panel 69.

Each of the termination blocks 62 is connected to the IN/OUT field 42 of a corresponding chassis 32 by the intermediate IN/OUT cable 65 (FIG. 10B). As described previously, the IN/OUT field 42 is in electrical communication with the cross-connect field 40 (e.g. by DSX switching circuitry). The cross-connect field 40 of the chassis 32 is interconnected a corresponding connector block 72 by an intermediate cross-connect cable 75. Cables $C_{XC}$ from other bays, routed within the horizontal cross-connect channels 78 (and vertical cross-connect channel 88) terminate at the front side of the termination panel 69.

It will be appreciated that the DSX system 30 of the present disclosure is utilized in the same manner as a conventional DSX system. The IN/OUT fields 42 allow the jack inserts 36, 38 to be connected to pieces of digital equipment. The cross-connect fields 40 allow the jack inserts 36, 38 to be cross-connected by semi-permanent jumpers. The jack inserts 36, 38 provide normally-through connections between the digital equipment connected to the IN/OUT blocks 42 and the cross-connect blocks 40. By inserting patch plugs in the monitor ports of the jack inserts 36, 38, signals passing through the jack inserts 36, 38 can be monitored without interrupting the signals. The tracer lamp circuits allow the cross-connected jack inserts being monitored to be traced as is described in U.S. Pat. No. 6,116,961. Plugs can be inserted in the in or out ports of the jack inserts 36, 38 for testing or diagnostic purposes, or for re-routing signals to different pieces of digital equipment.

DSX systems and chassis are also disclosed in U.S. application Ser. No. 10/277,174, entitled HIGH DENSITY DSX SYSTEM, and U.S. application Ser. No. 10/277,173, entitled REAR ACCESS DSX SYSTEM; both applications filed concurrently with parent application Ser. No. 10/277,175 and both incorporated herein by reference. Since many embodiments of the invention can be made without departing from the spirit and scope of the invention, the invention resides in the claims hereinafter appended.

We claim:

1. A telecommunications termination structure comprising:
   a termination panel having front and back sides and also including opposite first and second sides;
   termination members that extend through the termination panel, each termination member including a front portion that projects outwardly from the front side of the termination panel and a rear portion that projects outwardly from the rear side of the termination panel;

a first fanning strip positioned along the first side of the termination panel, the first fanning strip including a plurality of spaced-apart dividers defining spaces sized for receiving cables/wires;

a second fanning strip positioned along the second side of the termination panel, the second fanning strip including a plurality of spaced-apart dividers defining spaces sized for receiving cables/wires;

the first and second fanning strips being formed integral with the termination panel; and a cover for covering one of the front and rear sides of the termination panel, the cover including first and second spaced-apart pivot axes, the cover opening in a counterclockwise direction about the first axis and opening in a clockwise direction about the second axis.

2. The termination structure of claim 1, wherein the opposite first and second sides comprise left and right sides.

3. The termination structure of claim 1, further comprising first and second hinges for opening the cover, the first and second hinges respectively defining first and second spaced-apart and generally parallel pivot axes.

4. The termination structure of claim 3, wherein the first hinge extends along the first side of the termination panel and the second hinge extends along the second side of the termination panel.

5. The termination structure of claim 3, wherein the cover is connected to the termination panel by snap-fit hinge connections.

6. The termination structure of claim 1, wherein the termination panel has a termination density of at least 16 terminations per square inch.

7. A telecommunications termination structure comprising:

a termination panel having front and back sides and also including opposite first and second sides;

termination members that extend through the termination panel, each termination member including a front portion that projects outwardly from the front side of the termination panel and a rear portion that projects outwardly from the rear side of the termination panel;

a first fanning strip positioned along the first side of the termination panel, the first fanning strip including a plurality of spaced-apart dividers defining spaces sized for receiving cables/wires, the first fanning strip being formed integral with the termination panel;

a second fanning strip positioned along the second side of the termination panel, the second fanning strip including a plurality of spaced-apart dividers defining spaces sized for receiving cables/wires, the second fanning strip being formed integral with the termination panel; and a cover for covering one of the front and rear sides of the termination panel, the cover including first and second hinge connections, each of the first and second hinge connections defining an axis of rotation.

8. The termination structure of claim 7, wherein the opposite first and second sides comprise left and right sides.

9. The termination structure of claim 7, wherein the cover opens in a counterclockwise directions about the first hinge connection and opens in a clockwise directions about the second hinge connection.

10. The termination structure of claim 7, wherein the axes defined by the first and second hinge connections are spaced-apart and generally parallel to one another.

11. The termination structure of claim 7, wherein the cover is connected to the termination panel by snap-fit hinge connections.

12. The termination structure of claim 7, wherein the termination panel has a termination density of at least 16 terminations per square inch.

13. A telecommunications termination structure comprising:

a termination panel having front and back sides and also including opposite first and second sides;

termination connectors connected to the termination panel for termination of cable/wires at the front and back sides of the termination panel;

a first cable management device positioned along the first side of the termination panel, the first cable management device including a plurality of spaced-apart dividers defining spaces sized for receiving cables/wires;

a second cable management device positioned along the second side of the termination panel, the second cable management device including a plurality of spaced-apart dividers defining spaces sized for receiving cables/wires;

the first and second cable management devices being formed integral with the termination panel; and a cover for covering one of the front and rear sides of the termination panel, the cover including first and second spaced-apart pivot axes, the cover opening in a counterclockwise direction about the first axis and opening in a clockwise direction about the second axis.

14. A telecommunications termination structure comprising:

a termination panel having front and back sides and also including opposite first and second sides;

termination connectors connected to the termination panel for termination of cable/wires at the front and back sides of the termination panel;

a first cable management device positioned along the first side of the termination panel, the first cable management device including a plurality of spaced-apart dividers defining spaces sized for receiving cables/wires, the first cable management device being formed integral with the termination panel;

a second cable management device positioned along the second side of the termination panel, the second cable management device including a plurality of spaced-apart dividers defining spaces sized for receiving cables/wires, the second cable management device being formed integral with the termination panel; and a cover for covering one of the front and rear sides of the termination panel, the cover including first and second hinge connections, each of the first and second hinge connections defining an axis of rotation.

* * * * *

UNITED STATES PATENT AND TRADEMARK OFFICE
CERTIFICATE OF CORRECTION

| | |
|---|---|
| PATENT NO. | : 7,018,245 B2 |
| APPLICATION NO. | : 11/103669 |
| DATED | : March 28, 2006 |
| INVENTOR(S) | : Baker et al. |

It is certified that error appears in the above-identified patent and that said Letters Patent is hereby corrected as shown below:

Col. 9, lines 62-63, claim 9: "counterclockwise directions about the first hinge connection and opens in a clockwise directions about the" should read --counterclockwise direction about the first hinge connection and opens in a clockwise direction about the--

Signed and Sealed this

Thirtieth Day of January, 2007

JON W. DUDAS
*Director of the United States Patent and Trademark Office*